United States Patent
Guo et al.

(10) Patent No.: US 10,796,109 B2
(45) Date of Patent: Oct. 6, 2020

(54) CARD INSERTION STRUCTURE

(71) Applicant: PEGATRON CORPORATION, Taipei (TW)

(72) Inventors: Guo-Long Guo, Taipei (TW); Ho-Ching Huang, Taipei (TW); Wen-Cheng Tsai, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 79 days.

(21) Appl. No.: 16/264,293

(22) Filed: Jan. 31, 2019

(65) Prior Publication Data

US 2019/0251302 A1 Aug. 15, 2019

(30) Foreign Application Priority Data

Feb. 9, 2018 (TW) .............................. 107202090 U (51) Int. Cl.
| | |
|---|---|
| *G06K 7/00* | (2006.01) |
| *H04B 1/3816* | (2015.01) |
| *H04B 1/3818* | (2015.01) |
| *H01Q 1/24* | (2006.01) |
| *H01Q 1/22* | (2006.01) |

(52) U.S. Cl.
CPC ......... *G06K 7/0056* (2013.01); *H01Q 1/2216* (2013.01)

(58) Field of Classification Search
CPC .. G06K 7/0056; H04B 1/3816; H04B 1/3818; H01Q 1/243

USPC .......................................................... 235/411
See application file for complete search history.

(56) References Cited

U.S. PATENT DOCUMENTS

| | | | | |
|---|---|---|---|---|
| 6,162,075 | A * | 12/2000 | Hara ................... | H01R 13/633 439/159 |
| 2016/0072209 | A1* | 3/2016 | Triplett .............. | H01R 12/7076 439/587 |
| 2017/0162982 | A1* | 6/2017 | Wu ...................... | H04B 1/3816 |

FOREIGN PATENT DOCUMENTS

| | | |
|---|---|---|
| CN | 101296587 | 10/2008 |
| CN | 203205609 | 9/2013 |
| TW | I342181 | 5/2011 |
| TW | M427650 | 4/2012 |

\* cited by examiner

*Primary Examiner* — Toan C Ly
(74) *Attorney, Agent, or Firm* — J.C. Patents (57) ABSTRACT

A card insertion structure suited for a portable electronic device is provided. The portable electronic device includes a housing. The card insertion structure includes a base disposed in the housing, a pressing member movably disposed on the base, and a plastic spring strip disposed on the base. A portion of the pressing member is exposed out of the housing. The plastic spring strip leans against the pressing member and the base. A force supplied via an insertion of an electronic card drives the pressing member to deform the plastic spring strip, and after the electronic card passing by the pressing member and being inserted into the card insertion structure between the base and the housing, the pressing member is released and is restored by resilience of the plastic spring strip, and the electronic card is fixed with the housing by the pressing member.

10 Claims, 7 Drawing Sheets

CARD INSERTION STRUCTURE

CROSS-REFERENCE TO RELATED APPLICATION

This application claims the priority benefit of Taiwan application serial no. 107202090, filed on Feb. 9, 2018. The entirety of the above-mentioned patent application is hereby incorporated by reference herein and made a part of this specification.

BACKGROUND

Technology Field

The disclosure is related to a card insertion structure, and particularly a portable electronic device using a card insertion structure thereof.

Description of Related Art

With the evolution of the information technology, the electronic cards have become part of people's daily lives, so everyone carries a variety of electronic cards with them for use in every aspect of life. Accordingly, portable electronic devices have also been updated, and they are able to read related information from the above-mentioned electronic card, bringing more convenience in life everywhere.

However, the related modules of existing portable electronic device for reading the electronic card do not provide sufficient lock structure to allow the electronic card to be securely inserted in the portable electronic device.

Furthermore, the portable electronic device is also generally used in the field of communication, so as to facilitate effective information exchange with the electronic card. However, due to the trend of light weight, slim and short, basically, the antenna module of the portable electronic device must be adjacent to the reading module of the electronic card. Therefore, in the design stage, technicians of the field still have to try to exclude any possible factors by which the antenna module might be affected by the reading module.

SUMMARY

The disclosure provides a card insertion structure that provides a lock structure sufficient for the electronic card to be secured to the portable electronic device without affecting the wireless transmission function of the portable electronic device.

A card insertion structure of the disclosure is configured on a portable electronic device. The portable electronic device includes a housing. The card insertion structure includes a base, a pressing member, and a plastic spring strip. The base is disposed inside the housing. The pressing member is movably disposed on the base, and a portion of the pressing member is exposed out of the housing. The plastic spring strip is disposed on the base and leans against the pressing member and the base. When the electronic card is being inserted between the base and the housing, the electronic card is passing by the pressing member, and the pressing member is subjected to a force applied by the pressing member and deforms the plastic spring strip. When the electronic card passes by the pressing member and is inserted between the base and the housing, the pressing member is released and restored due to resilience of the plastic spring strip, and the pressing member is exposed out of the portion of the housing to fix the electronic card to the housing.

In an embodiment of the disclosure, the portable electronic device further includes an antenna module disposed in the housing, and the orthogonal projection of the antenna module on the base at least partially overlaps with the orthogonal projection of the plastic spring strip on the base.

In an embodiment of the disclosure, the plastic spring strip is made of polyetheretherketone (PEEK).

In an embodiment of the disclosure, the plastic spring strip is made of polyoxymethylene (POM).

In an embodiment of the disclosure, the plastic spring strip has a first body and an elastic arm. The first body is assembled on the base, and the elastic arm is extended from the first body away from the base to lean against the pressing member.

In an embodiment of the disclosure, the pressing member has a second body and a protrusion portion. The second body is movably sleeved on a pillar of the base, and the protrusion portion is extended from the second body and is exposed out of the housing. The elastic arm leans against the protrusion portion.

In an embodiment of the disclosure, a spring is further included to lean against the second body and the base.

In an embodiment of the disclosure, the protrusion portion is subjected to the force and makes the pressing member to move along the pillar, and deforms the plastic spring strip and the spring, and after the force is removed, the plastic spring strip and the spring restore the pressing member and make the protrusion portion to lock the electronic card.

In an embodiment of the disclosure, the pillar is extended along a longitudinal direction so that the pressing member moves along the longitudinal direction due to the force, and the electronic card moves in or out of the card insertion structure along a lateral direction, and the longitudinal direction is orthogonal to the lateral direction.

In an embodiment of the disclosure, a lock member is further included, and is locked on the pillar to limit the second body.

Based on the above, the card insertion structure is configured in the manner that the pressing member and the plastic spring strip are disposed on the base of the housing of the portable electronic device and the portion of the pressing member is exposed out of the housing, such that the plastic spring strip leans against the pressing member and the base. In this manner, the user may apply a force to the portion of the pressing member exposed out of the housing to deform the plastic spring strip, so that the electronic card can be inserted into the card insertion structure smoothly. Then, after the electronic card is move and passes by the pressing member and the user removes the force, the pressing member is released and the resilience of the plastic spring strip can drive the pressing member to be restored. In the meantime, the portion of the pressing member exposed out of the housing is used as a lock structure for fixing the electronic card to the housing, thereby keeping the electronic card stable in the housing without being detached from the card insertion structure due to the movement of the portable electronic device, so that the portable electronic device can read the related information in the electronic card smoothly without being affected by the foregoing conditions.

In order to make the aforementioned features and advantages of the disclosure more comprehensible, embodiments accompanying figures are described in detail below.

DETAILED DESCRIPTION

Figure 1:
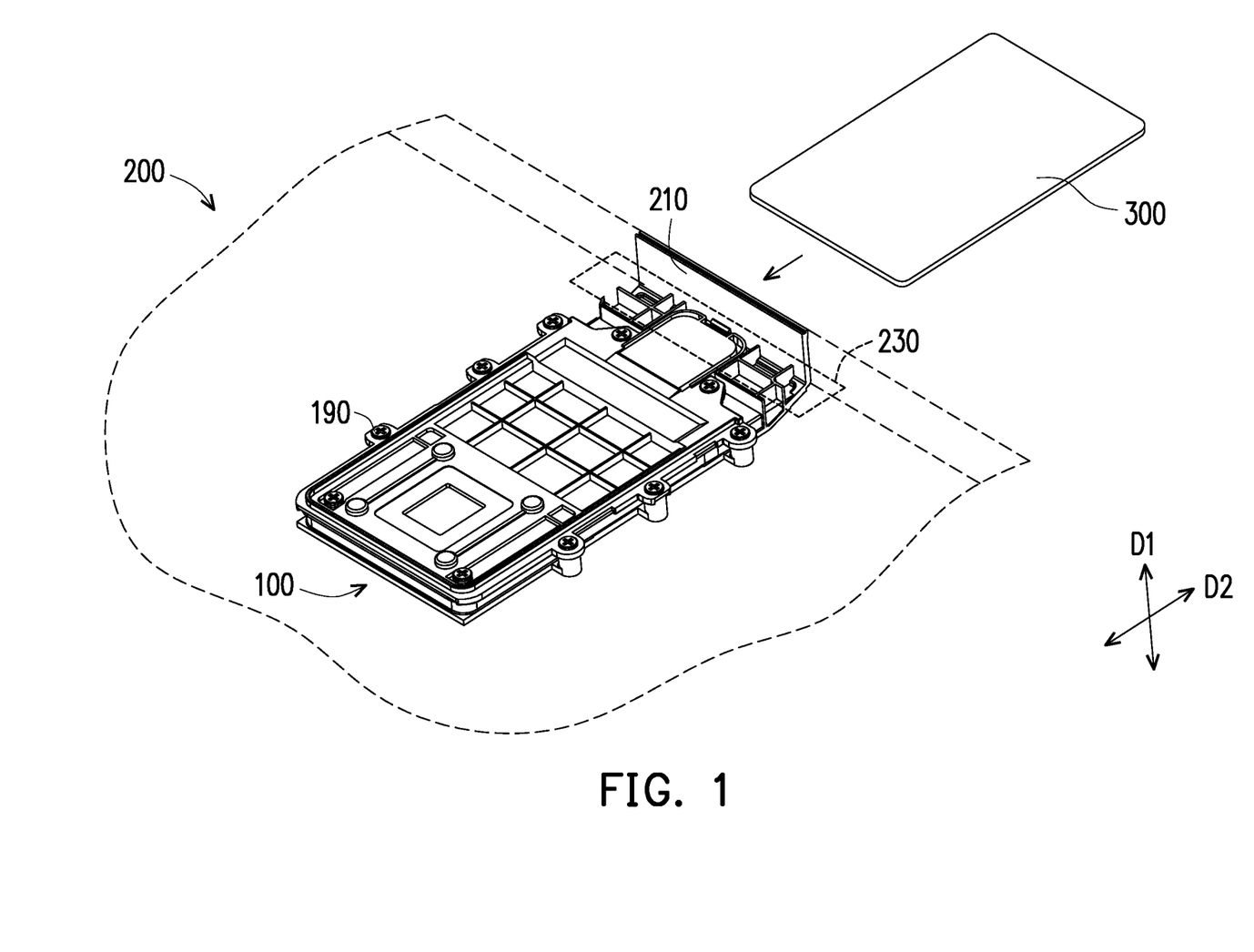
FIG. 1 is a partial schematic view of a card insertion structure applied to a portable electronic device according to an embodiment of the disclosure.
Figure 2:
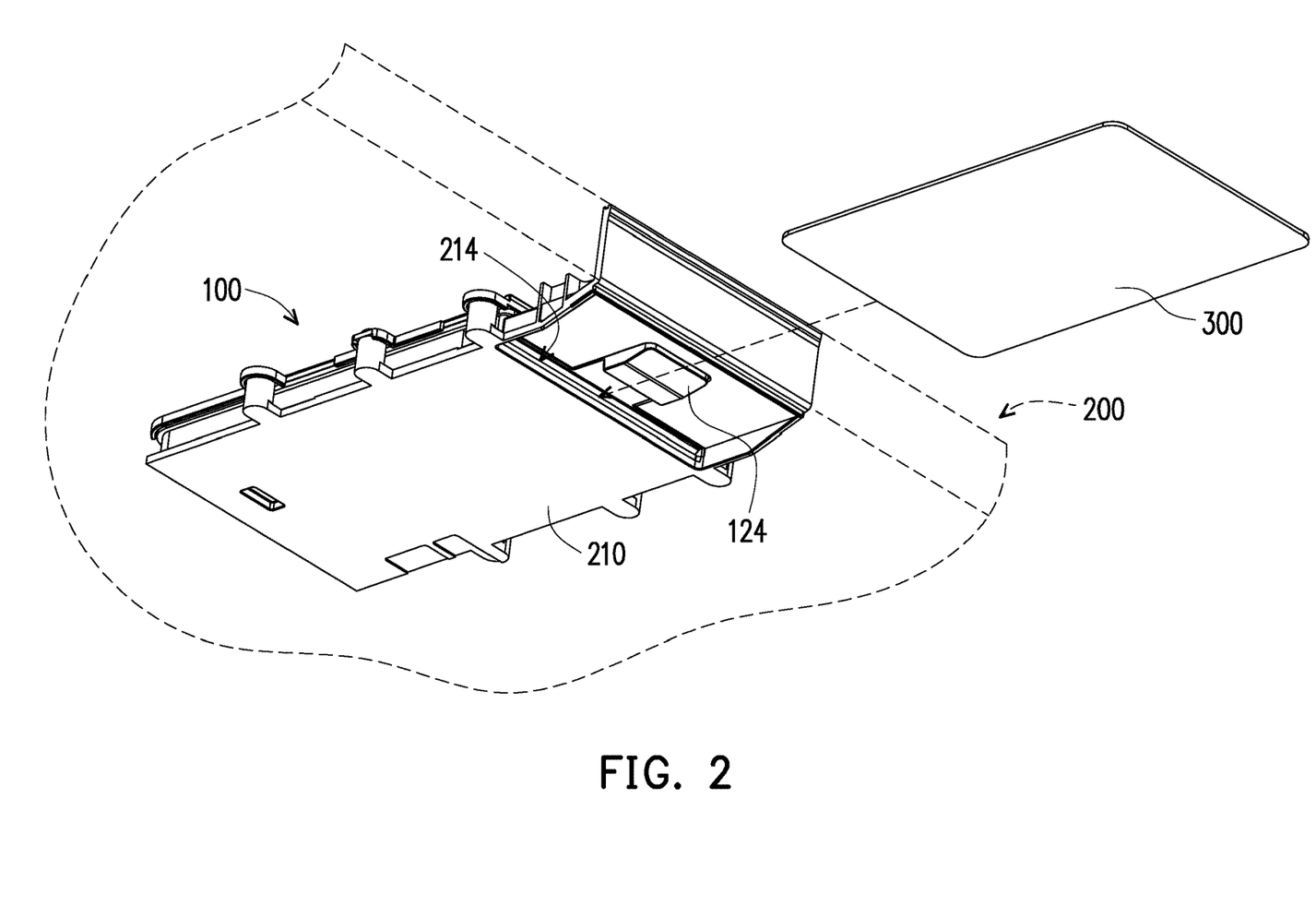
FIG. 2 is a schematic view of FIG. 1 from another perspective.
Figure 3:
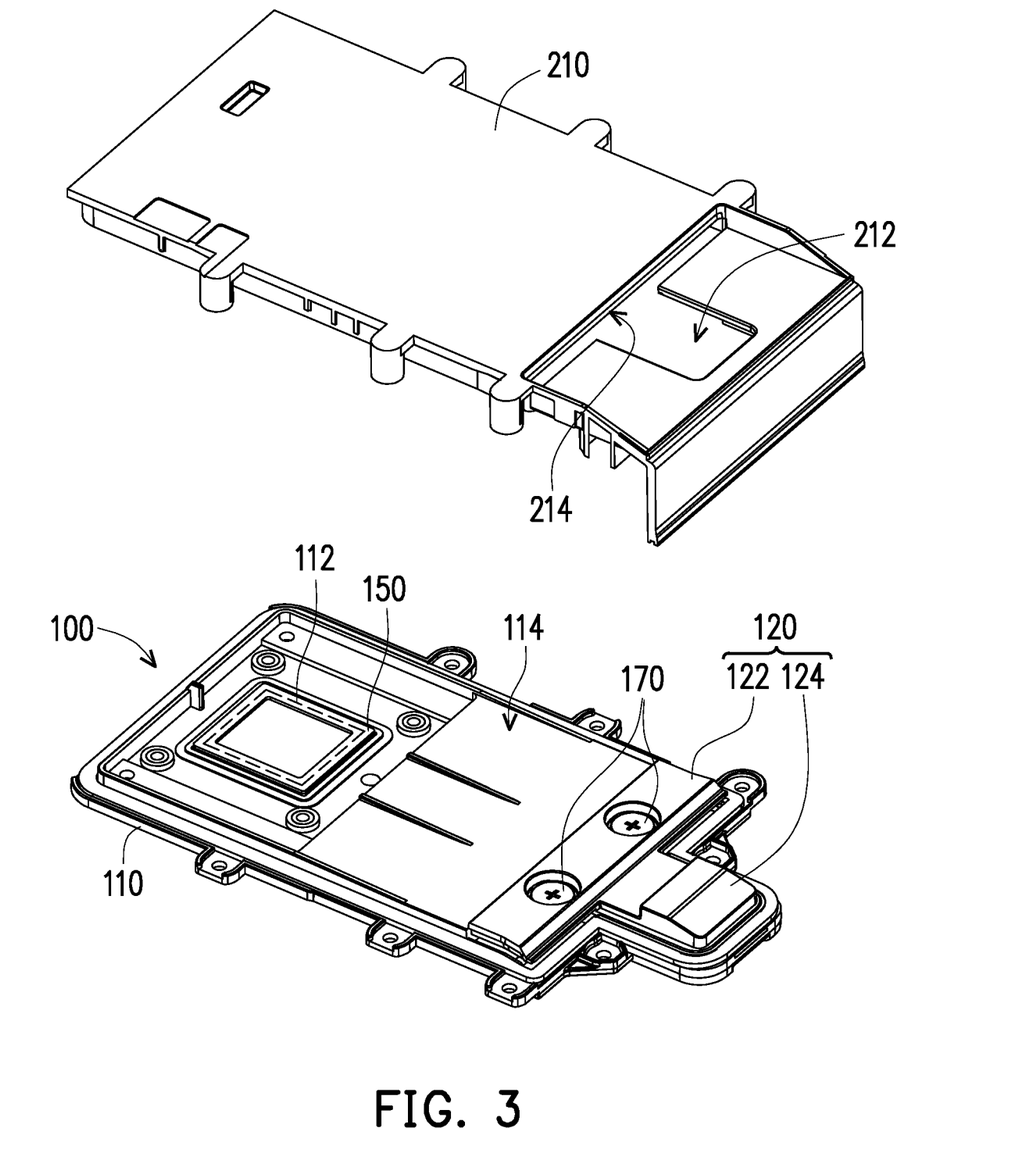
FIG. 3 is a schematic view illustrating initial assembly of the card insertion structure and corresponding housing.

FIG. 1 is a partial schematic view of a card insertion structure applied to a portable electronic device according to an embodiment of the disclosure. FIG. 2 is a schematic view of FIG. 1 from another perspective. FIG. 3 is a schematic view illustrating initial assembly of the card insertion structure and corresponding housing. Referring to FIG. 1 to FIG. 3, in this embodiment, a card insertion structure 100 is disposed in a housing 210 of a portable electronic device 200 and is used to accommodate and position an electronic card 300 (e.g., an IC card, a smart card, etc.). Meanwhile, after the electronic card 300 is inserted into the housing 210 and carried on a stage 114, the control system (not shown) of the portable electronic device 200 can read the information in the inserted electronic card 300 through a reading module 112.

Figure 4:
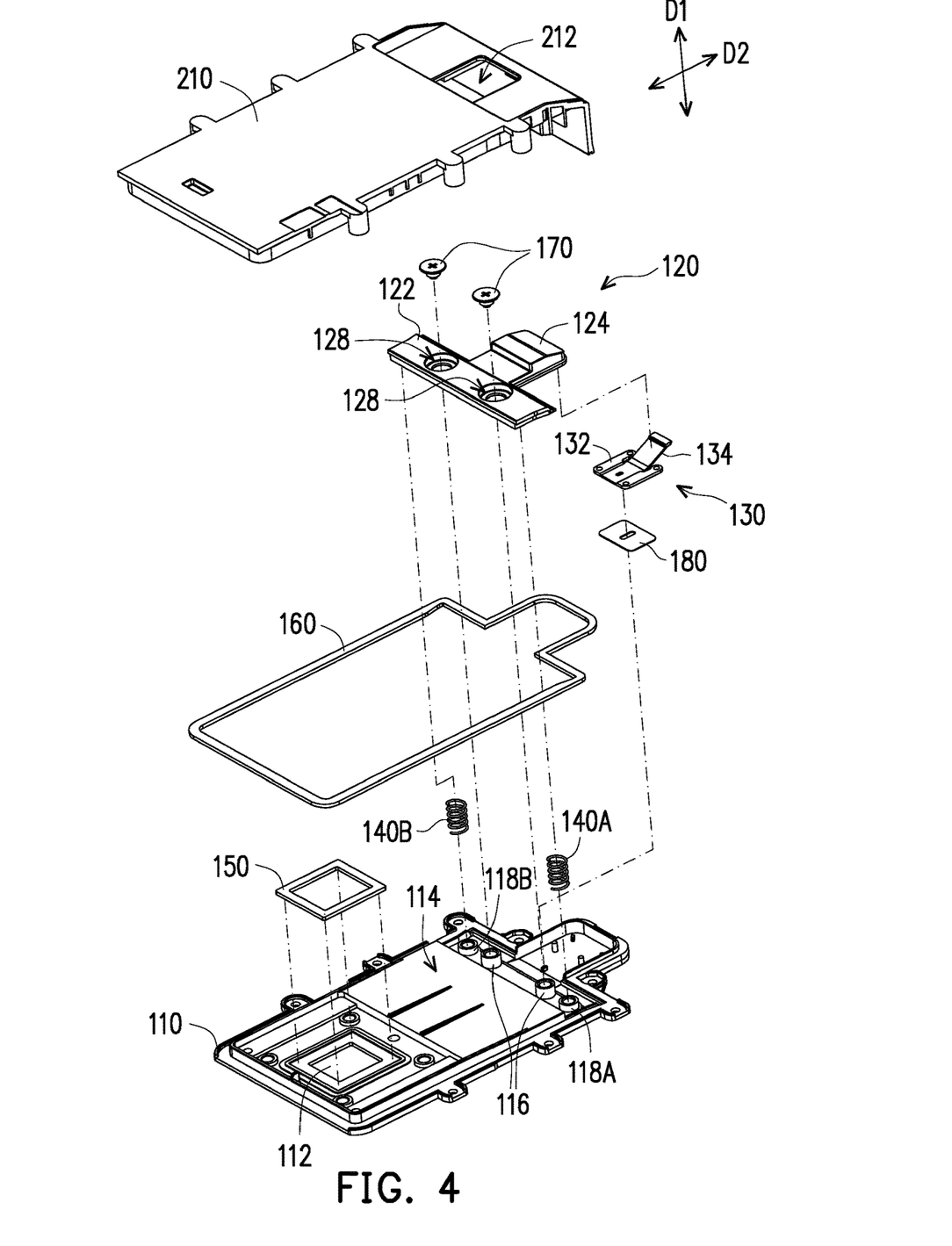
FIG. 4 and FIG. 5 are schematic views illustrating the respective assembly of the card insertion structure and the corresponding housing.
Figure 5:
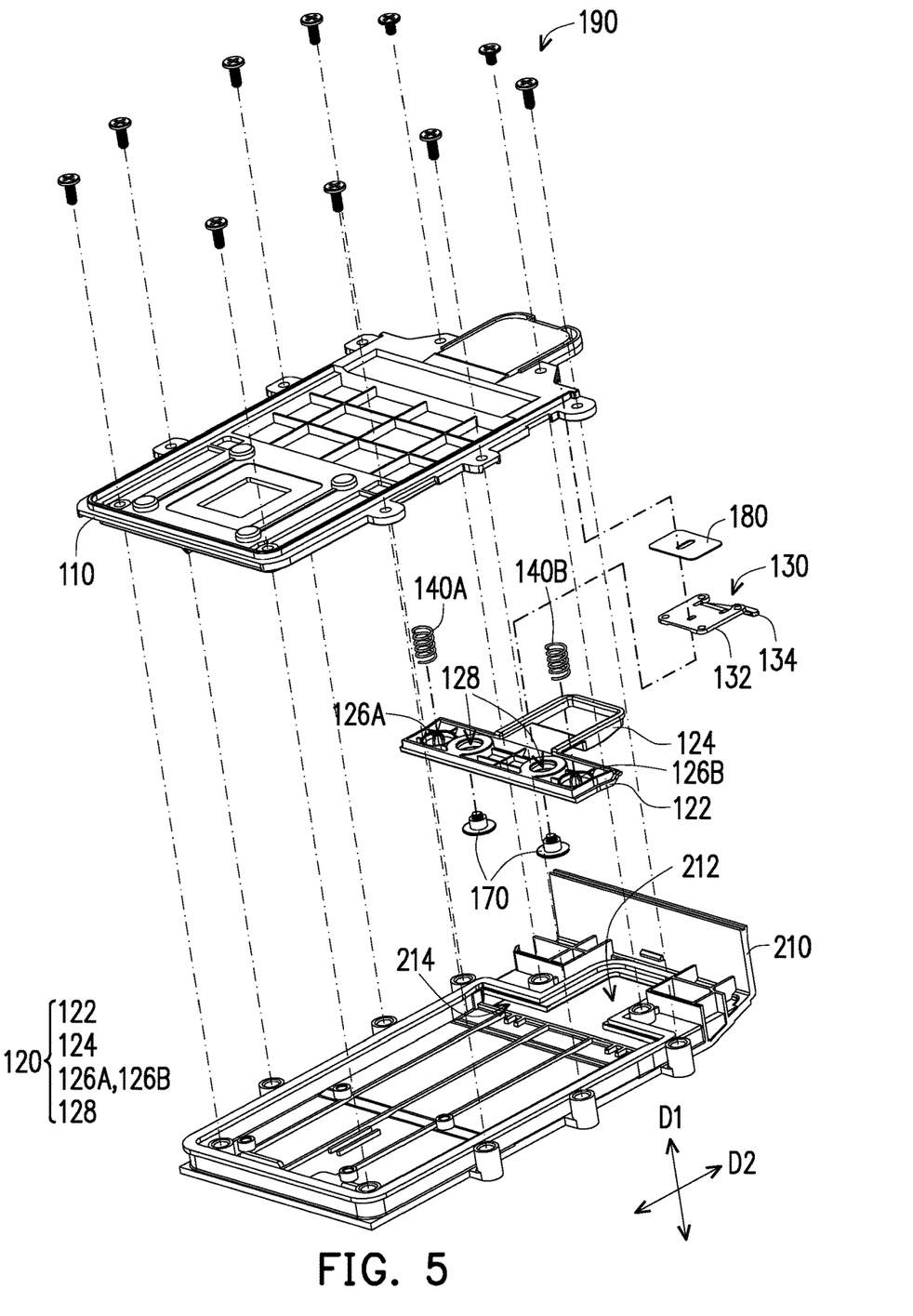

FIG. 4 and FIG. 5 are schematic views illustrating the respective assembly of the card insertion structure and the corresponding housing, which are shown from different perspectives and different assembling components are shown for easy identification. Referring to FIG. 3 to FIG. 5, the card insertion structure 100 includes a base 110, a pressing member 120, and a plastic spring strip 130, wherein the base 110 is disposed in the housing 210, the pressing member 120 is movably disposed on the base 110, and a portion of the pressing member 120 is exposed out of the housing 210. The plastic spring strip 130 is disposed on the base 110 and leans against the pressing member 120 and the base 110. For the base 110, it is assembled on the housing 210 by a lock member 190. The pressing member 120 of the card insertion structure 100 is disposed on one side of the base 110, and the reading module 112 is disposed on another side of the base 110. In the insertion direction of the electronic card 300, the stage 114 is located between the pressing member 120 and the reading module 112.

Further, the plastic spring strip 130 has a first body 132 and an elastic arm 134, wherein the first body 132 (also a plate structure) is assembled on the base 110 via a pad 180, and the elastic arm 134 is extended from the first body 132 away from the base 110 until it leans against the pressing member 120. The pressing member 120 has a second body 122 and a protrusion portion 124, wherein the second body 122 is movably sleeved on a pillar 116 on the base 110. As shown in the drawings, the second body 122 has a hole 128 which is penetrated by the pillar 116 and then the second body 122 is locked to the pillar 116 by the lock member 170, thereby providing a fastening effect when the second body 122 is moved. Herein, the extending direction of the pillar 116 is regarded as a longitudinal direction D1, and thus the assembling direction of the pressing member 120 shown in FIG. 4 and FIG. 5 is also its movable direction, that is, the aforementioned longitudinal direction D1. The protrusion portion 124 is structurally extended from the second body 122. In this manner, when the pressing member 120 is assembled on the base 110, the elastic arm 134 of the plastic spring strip 130 leans against the protrusion portion 124.

Furthermore, referring again to FIG. 2 to FIG. 4, the protrusion portion 214 of the assembled pressing member 120 can be exposed by passing through a longitudinal opening 212 of the housing 210 and thus blocks a lateral opening 214 of the housing 210 at the front, where a lateral direction D2 and the longitudinal direction D1 are orthogonal to each other. Accordingly, as shown in FIG. 2, when the electronic card 300 is to be inserted into the portable electronic device 200, by the configuration of the related components aforementioned above, i.e., the base 110, the plastic spring strip 130 and the pressing member 120 in the housing 210, the user may utilize the electronic card 300 to apply force to the protrusion portion 124 of the pressing member 120, thereby deforming the plastic spring strip 130 and making the pressing member 120 to move toward the base 110, so that the lateral opening 214 is exposed and the electronic card 300 can be smoothly inserted into the card insertion structure 100 in the housing 210 via the lateral opening 214, and the portable electronic device 200 can perform information accessing operation on the electronic card 300 through the reading module 112. Then, after the electronic card 300 is completely inserted in, the electronic card 300 passes by the protrusion portion 124 of the pressing member 120 and the user removes the force. The protrusion portion 124 of the released pressing member 120 is restored due to the resilience of the elastic arm 134 of the plastic spring strip 130; that is, moving back to the position before the lateral opening 214, and thus the electronic card 300 can be successfully locked into the card insertion structure 100. That is, the electronic card 300 is fixed to the housing 210 and the occurrence of detaching can be avoided. In particular, in the case that the portable electronic device 200 is a rugged type computer, since it is mostly used in an environment where vibrations and collisions occur a lot, it is necessary to keep the electronic card 300 stable in the portable electronic device 200.

Referring again to FIG. 1, in the exemplary embodiment, the portable electronic device 200 further includes an antenna module 230, which provides the portable electronic device 200 wireless transmission (communication) functions; that is, the portable electronic device 200 can read information of the electronic card 300 through the reading module 112, and then perform massage transmission function through the antenna module 200. However, as described above, the housing 210 of the portable electronic device 200 is designed to be light, slim and short so the components therein must be compactly configured to achieve better space utilization. Therefore, in this embodiment, the antenna module 140 is substantially disposed at the edge of the interior of the housing 210 and located above card insertion structure 100 (as shown in FIG. 1).

Accordingly, it is inevitable that the card insertion structure 100 is affected by the antenna module 230 and it is necessary to avoid using material that might affect its wireless transmission. Therefore, in the exemplary embodiment, disposing the plastic spring strip 130 at that location, which allows the orthogonal projection of the antenna module 230 on the base 110 at least partially to overlap with the orthogonal projection of the plastic spring strip 130 on the base 110, can effectively overcome the effect of signal shielding which might be caused by metal elastic component.

Meanwhile, the material of the plastic spring strip 130 of the embodiment is polyetheretherketone (PEEK), which has better physical characteristics, for example the tensile modulus (at 23° C.) of 3700 MPa, the tensile stress (yield, at 23° C.) of 100 MPa, the tensile strain (fracture, at 23° C.) of 45%, the flexural modulus (at 23° C.) of 4100 MPa and the heat distortion temperature is 152° C. Therefore, it is possible to use plastic injection technique to form the plastic spring strip 130 having a thickness of 0.5 mm to 0.8 mm as well as maintain its elasticity. In other words, when the plastic spring strip 130 is in the card insertion structure and subjected to a press fatigue test under a force of 400 gram to 500 gram, it still maintains a good holding force and a good texture due to the above characteristics. Furthermore, in another embodiment, the plastic spring strip may also be made of polyoxymethylene (POM) to achieve the aforementioned effects.

Figure 6A:
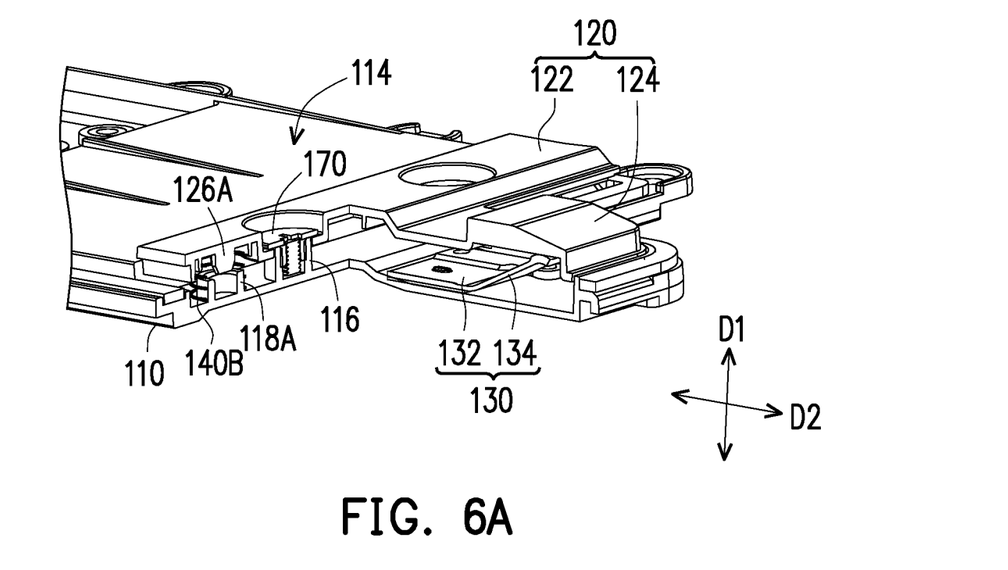
FIG. 6A-FIG. 6C are partial cross-sectional views illustrating the card insertion structure in different actuation states.
Figure 6B:
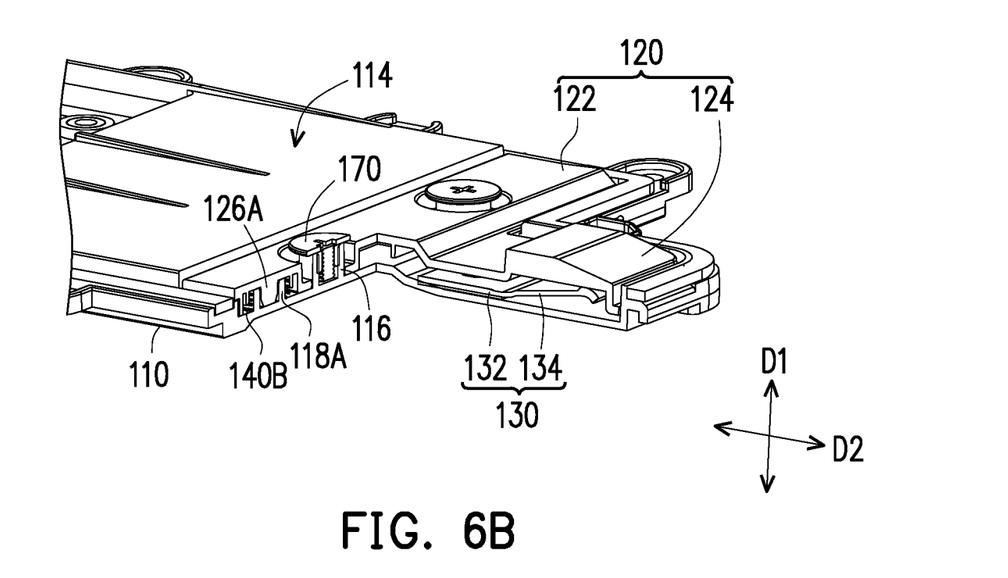
Figure 6C:
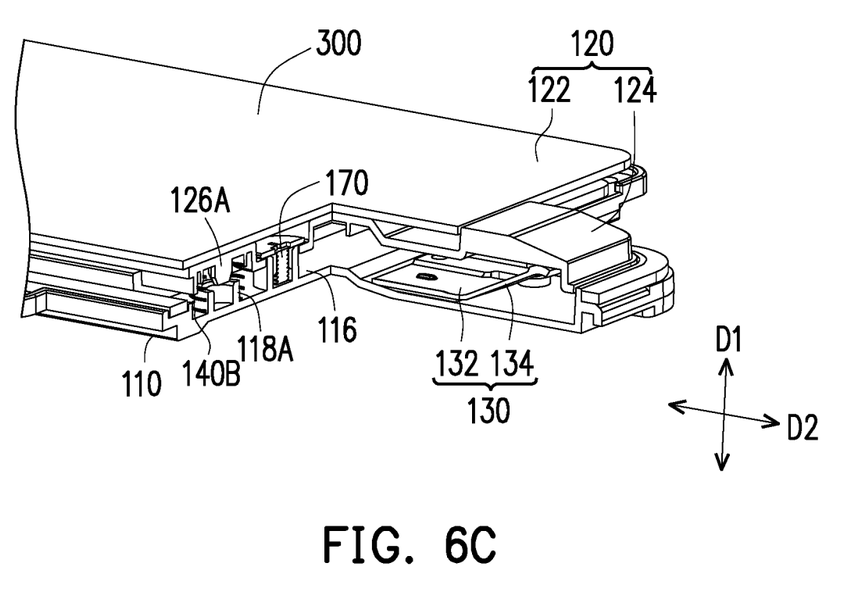

Referring to FIG. 4 and FIG. 5 again, in the exemplary embodiment, the card insertion structure 100 further includes springs 140A and 140B sleeved on pillars 118A and 118B of the base 110 and pillars 126A and 126B of the pressing member 120, that is, leaning against the second body 122 and the base 110. FIG. 6A-FIG. 6C are partial cross-sectional views illustrating the card insertion structure in different actuation states. Referring to FIG. 6A to FIG. 6C, when the user intends to insert the electronic card 300 into the housing 210, and applies force F1 to the protrusion portion 124 by the electronic card 300, the pressing member 120 is moved along the longitudinal direction D1 (i.e., along the pillar 116). And thus, the plastic spring strip 130 and the springs 140A and 140B are deformed so that the electronic card 300 is successfully inserted into the card insertion structure 100 along the lateral direction D2. Thereafter, as shown in FIG. 6C, when the user removes the force F1, the resilience of the plastic spring strip 130 and the springs 140A, 140B can restore the pressing member 120 to along the longitudinal direction D1 and make the protrusion portion 124 block the lateral opening 214 at the front (shown in FIG. 2) and provide a fastening effect on the electronic card 300, such that the electronic card 300 is fixed to the housing 210. Herein, the springs 140A, 140B serve to mitigate the force F1 and avoid the stress of component from being concentrated, so that the user makes less effort.

In addition, the card insertion structure 100 also includes buffer members 150, 160, wherein the buffer member 150 is disposed above the reading module 112. When the electronic card 300 is inserted into the card insertion structure 100 and carried on the stage 114, the buffer member 150 can provide sufficient spacing between the electronic card 300 and the reading module 112 to avoid collision of the two and prevent the reading performance from being affected. The buffer member 160 has the same contour as the base 110, which provides sufficient buffering space between the base 110 and the housing 210 to facilitate insertion of the electronic card 300 and avoid component interference.

In summary, in the embodiments of the disclosure, the card insertion structure is configured in the manner that the pressing member and the plastic spring strip are disposed on the base of the housing of the portable electronic device and the portion of the pressing member is exposed out of the housing, and the plastic spring strip leans against the pressing member and the base. In this manner, the user may apply a force to the portion of the pressing member exposed out of the housing to deform the plastic spring strip, so that the electronic card can be inserted into the card insertion structure smoothly. Then, after the user removes the force, the pressing member is released and the resilience of the plastic spring strip is used to restore the pressing member. In the meantime, the portion of the pressing member exposed out of the housing is used as a lock structure for fixing the electronic card to the housing, thereby keeping the electronic card stable in the housing without being detached from the card insertion structure due to the movement of the portable electronic device, so that the portable electronic device can read the related information in the electronic card successfully without being affected by the foregoing conditions.

Most importantly, when the portable electronic device is equipped with an antenna module and the antenna module overlaps with the lock structure due to the compact configuration, with the physical characteristics of the plastic spring strip, it is possible to prevent the plastic spring strip overlapping with the antenna module from affecting the wireless transmission function of the antenna module, thereby avoiding the signal shielding caused by metal. Meanwhile, the plastic spring strip is mainly made of polyetheretherketone or polyoxymethylene, so that the physical characteristics thereof make it possible to form a plate structure having thinner thickness through the injection molding technology as well as facilitate special configuration. Moreover, the physical characteristics of the plastic spring strip allow it to serve as the elastic feature for supporting the pressing member and make it qualified for the strength and fatigue tests required in the portable electronic device, thereby improving the durability of the lock structure.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A card insertion structure, for being configured on a portable electronic device, the portable electronic device comprising a housing, the card insertion structure comprising:
   a base, disposed in the housing;
   a pressing member, movably disposed on the base, a portion of the pressing member exposed out of the housing; and
   a plastic spring strip disposed on the base and leaning against the pressing member and the base, wherein when an electronic card is being inserted between the base and the housing, the electronic card is passing by the pressing member, and the pressing member is subjected to a force applied by the electronic card and deforms the plastic spring strip, when the electronic card passes by the pressing member and is inserted between the base and the housing, the pressing member is released and restored due to resilience of the plastic spring strip, and the pressing member is exposed out of a portion of the housing to fix the electronic card to the housing.

2. The card insertion structure according to claim 1, wherein the portable electronic device further comprises an antenna module disposed in the housing, and an orthogonal projection of the antenna module on the base at least partially overlaps with an orthogonal projection of the plastic spring strip on the base.

3. The card insertion structure according to claim 1, wherein the plastic spring strip is made of polyetheretherketone (PEEK).

4. The card insertion structure according to claim 1, wherein the plastic spring strip is made of polyoxymethylene (POM).

5. The card insertion structure according to claim 1, wherein the plastic spring strip has a first body and an elastic arm, the first body is assembled on the base, the elastic arm is extended from the first body away from the base to lean against the pressing member.

6. The card insertion structure according to claim 5, wherein the pressing member has a second body and a protrusion portion, the second body is movably sleeved on a pillar of the base, the protrusion portion is extended from the second body and is exposed out of the housing, and the elastic arm leans against the protrusion portion.

7. The card insertion structure according to claim 6, further comprising a spring leaning against the second body and the base.

8. The card insertion structure according to claim 7, wherein the protrusion portion is subjected to the force and makes the pressing member to move along the pillar, and deforms the plastic spring strip and the spring, and after the force is removed, the plastic spring strip and the spring restore the pressing member and make the protrusion portion to lock the electronic card.

9. The card insertion structure according to claim 6, wherein the pillar is extended along a longitudinal direction such that the pressing member moves along the longitudinal direction due to the force, and the electronic card moves in or out of the card insertion structure along a lateral direction, the longitudinal direction is orthogonal to the lateral direction.

10. The card insertion structure according to claim 5, further comprising a lock member locked with the pillar to limit the second body.

* * * * *